US009757915B2

(12) United States Patent
Rochette et al.

(10) Patent No.: US 9,757,915 B2
(45) Date of Patent: Sep. 12, 2017

(54) TIRE VULCANIZING PRESS COMPRISING INDUCTION HEATING MEANS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Alain Rochette, Clermont-Ferrand (FR); Didier Valentin, Clermont-Ferrand (FR)

(73) Assignees: COMPAGNIE GENERALE DES ETABLISSEMENTS MICHELIN (FR); MICHELIN RECHERCHE ET TECHNIQUE S.A. (CH)

( * ) Notice: Subject to any disclaimer, the term of this patent is extended or adjusted under 35 U.S.C. 154(b) by 60 days.

(21) Appl. No.: 14/354,623

(22) PCT Filed: Oct. 18, 2012

(86) PCT No.: PCT/FR2012/052371
§ 371 (c)(1),
(2) Date: Apr. 28, 2014

(87) PCT Pub. No.: WO2013/060968
PCT Pub. Date: May 2, 2013

(65) Prior Publication Data
US 2014/0290833 A1  Oct. 2, 2014

(30) Foreign Application Priority Data

Oct. 28, 2011  (FR) .................................... 11 59835

(51) Int. Cl.
*B29C 35/08* (2006.01)
*B29D 30/06* (2006.01)
(Continued)

(52) U.S. Cl.
CPC .......... *B29D 30/0662* (2013.01); *B29C 33/06* (2013.01); *B29D 30/0629* (2013.01);
(Continued)

(58) Field of Classification Search
CPC  B29D 30/0662; B29D 30/0601; B29C 35/08; B29C 2035/0811
See application file for complete search history.

(56) References Cited

U.S. PATENT DOCUMENTS 1,566,500 A   12/1925  Northrup
1,791,934 A    2/1931  Northrup
(Continued)

FOREIGN PATENT DOCUMENTS

CN    1626334 A   6/2005
EP    0749267 A2  4/1996
(Continued)

OTHER PUBLICATIONS

Machine generated English language translation of JP 2000-87135 (original document dated Mar. 2000).*
(Continued)

*Primary Examiner* — Martin Rogers
(74) *Attorney, Agent, or Firm* — Dickinson Wright PLLC

(57) ABSTRACT

The curing press for a tire blank comprises:
 a mold and
 inductors capable of heating the press by electromagnetic induction, each inductor comprising a core (36) comprising two feet (40) having respective undersides (60) which are flat and inclined in relation to one another.

7 Claims, 6 Drawing Sheets

(51) Int. Cl.
  *B29C 33/06*  (2006.01)
  *H05B 6/10*  (2006.01)
(52) U.S. Cl.
  CPC ........ *H05B 6/10* (2013.01); *B29C 2035/0811* (2013.01); *B29D 2030/0674* (2013.01)

(56) References Cited

U.S. PATENT DOCUMENTS

| | | | | |
|---|---|---|---|---|
| 1,996,502 | A * | 4/1935 | Brown | H05B 6/108 |
| | | | | 180/339 |
| 2,010,622 | A * | 8/1935 | Brown | H05B 6/108 |
| | | | | 219/635 |
| 2,094,511 | A * | 9/1937 | Welch | B29D 30/54 |
| | | | | 152/187 |
| 3,906,181 | A * | 9/1975 | Hibino | H01F 27/24 |
| | | | | 117/222 |
| 3,990,821 | A * | 11/1976 | MacMillan | B29D 30/54 |
| | | | | 425/19 |
| 4,048,458 | A * | 9/1977 | Zirk, Sr. | H05B 6/101 |
| | | | | 156/274.2 |
| 4,321,444 | A * | 3/1982 | Davies | H05B 6/365 |
| | | | | 219/646 |
| 4,544,985 | A * | 10/1985 | Metz | B23Q 7/043 |
| | | | | 336/136 |
| 4,599,061 | A * | 7/1986 | Manabe | B29C 33/06 |
| | | | | 219/618 |
| 4,858,675 | A * | 8/1989 | Senillou | B22D 41/08 |
| | | | | 164/423 |
| 5,212,435 | A * | 5/1993 | Dutro | H02P 25/04 |
| | | | | 318/785 |
| 5,622,669 | A * | 4/1997 | Dailliez | B29C 33/06 |
| | | | | 264/297.5 |
| 5,752,150 | A * | 5/1998 | Kato | G03G 15/2053 |
| | | | | 219/619 |
| 7,022,951 | B2 * | 4/2006 | Larive | H05B 6/145 |
| | | | | 219/619 |
| 7,195,047 | B2 | 3/2007 | Sieverding | |
| 2002/0015746 | A1 * | 2/2002 | Mitamura | B29C 35/0272 |
| | | | | 425/50 |
| 2003/0178125 | A1 * | 9/2003 | Nowotarski | B29D 30/54 |
| | | | | 156/96 |
| 2003/0183622 | A1 * | 10/2003 | Okada | B29C 35/0272 |
| | | | | 219/635 |
| 2005/0133149 | A1 | 6/2005 | Sieverding | |

FOREIGN PATENT DOCUMENTS

| | | | | |
|---|---|---|---|---|
| EP | 1440781 A1 | | 7/2002 | |
| JP | 10-111981 | * | 4/1998 | ............ G07F 11/70 |
| JP | 2001205636 | | 1/2000 | |
| JP | 2000-87135 | * | 3/2000 | ............ C21D 1/10 |
| JP | 2001001342 A | | 1/2001 | |
| JP | 2003112320 A | | 10/2001 | |
| JP | 2006-224417 | * | 8/2006 | ............ B29C 33/02 |
| SU | 852618 A1 | | 8/1979 | |
| WO | 9841061 | | 3/1998 | |

OTHER PUBLICATIONS

Machine generated English language translation of JP 2006-224417 (original document dated Aug. 2006).*
Machine generated English language translation of JP 10-111981 (original document dated Apr. 1998).*
International Search Report for PCT/FR2012/052371 dated Feb. 28, 2013.
English translation of Written Opinion of the Int. Searching Authority for PCT/FR2012/052371 dated Apr. 28, 2014.
Chinese Office Action on application CN100738 dated May 28, 2015.

* cited by examiner

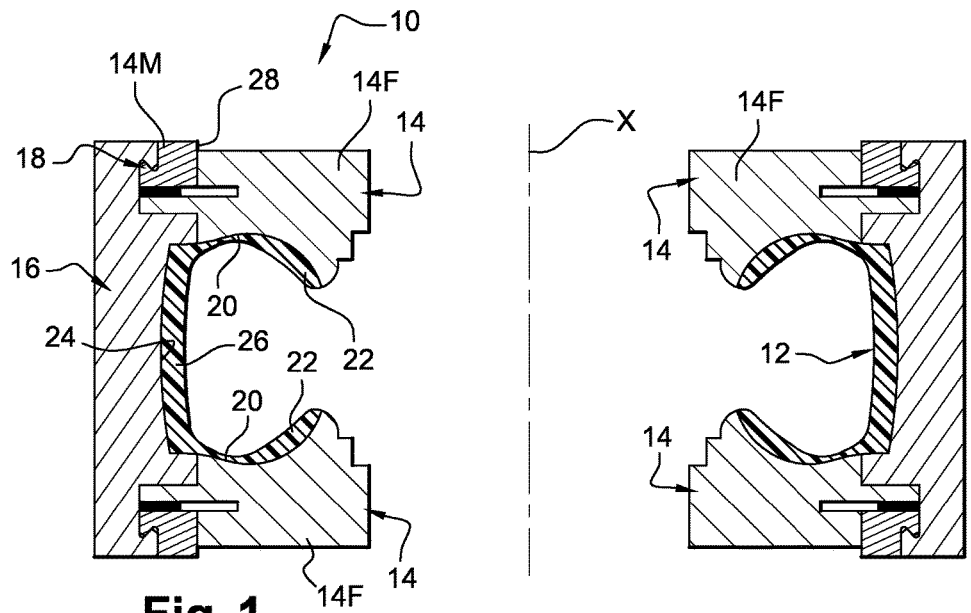
Fig. 1
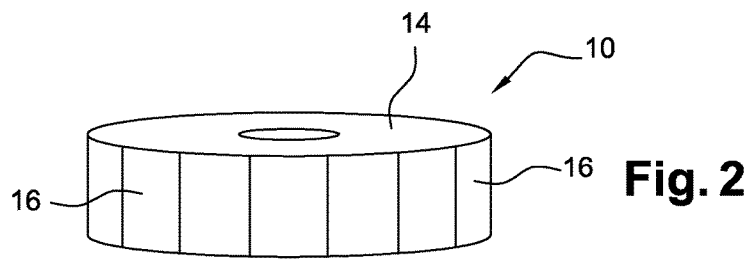
Fig. 2
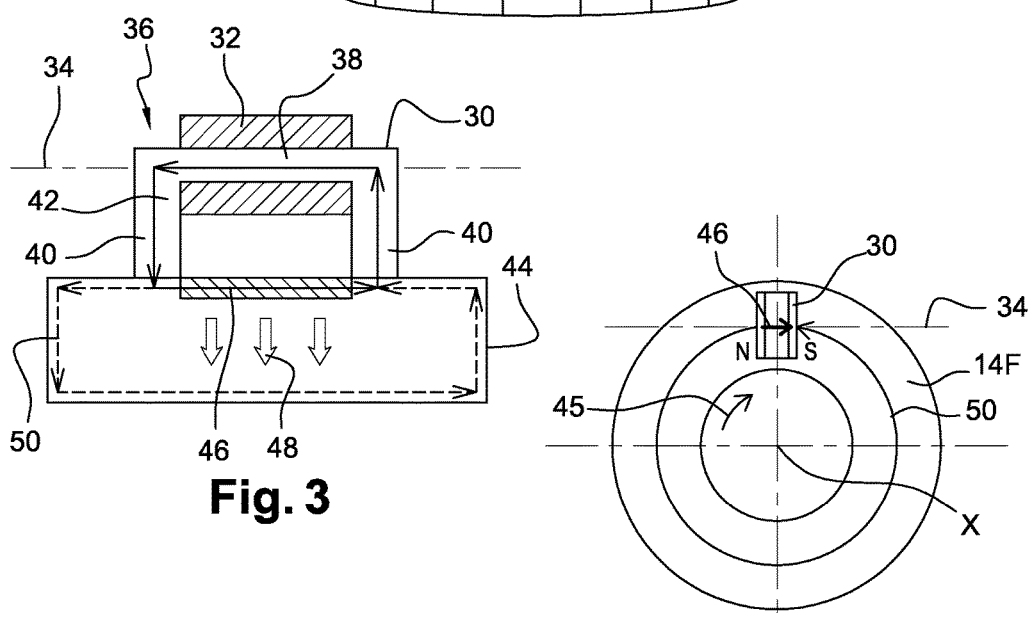
Fig. 3
Fig. 4

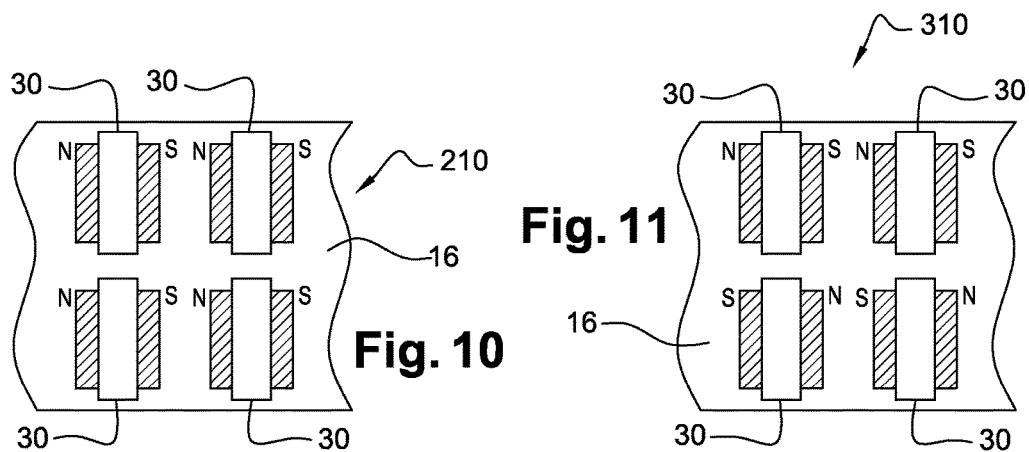
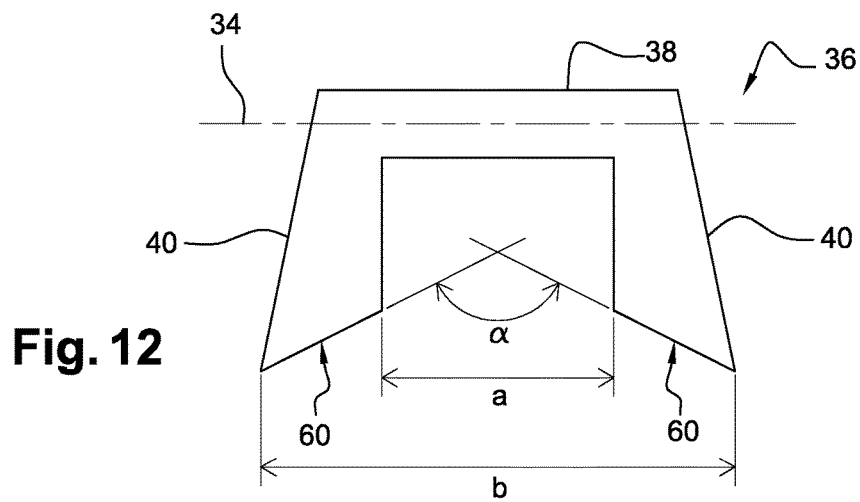
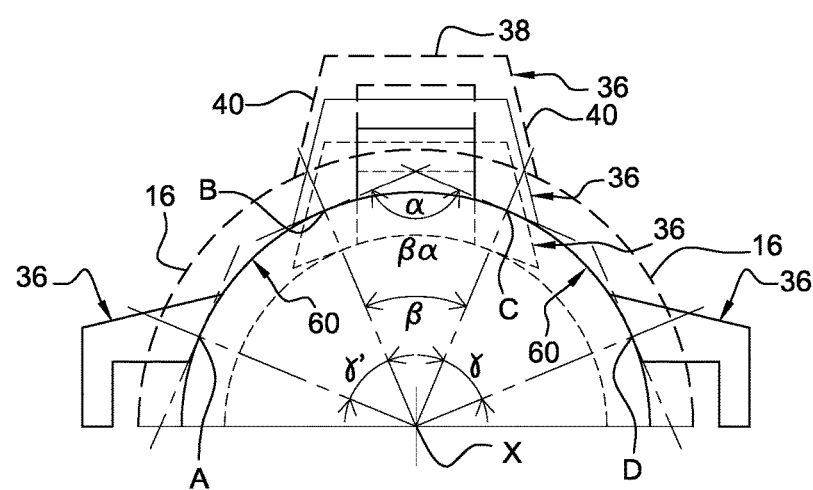

TIRE VULCANIZING PRESS COMPRISING INDUCTION HEATING MEANS

This application claims benefit of the filing date of PCT/FR2012/052371, filed Oct. 18, 2012, which claims the benefit of FR1159835, filed Oct. 28, 2011, the entire contents of each of which are incorporated herein by reference for all purposes.

BACKGROUND

1. Field

The disclosure relates to curing presses for tires.

2. Description of Related Art

In order to produce a tire for a vehicle wheel, a blank comprising raw rubber and various constituents such as reinforcing elements is formed. Once the blank has been finished, it is cured in a press so as to vulcanize the rubber. The blank is received in a press mould, which, during the curing process, shapes the tire definitively.

It is known to heat the mould by means of a heat transfer fluid, such as the vapour of pressurized water. This heating method makes it possible to obtain a homogeneous distribution of the temperature in the mould. It is necessary however to feed the fluid to the mould at high temperature, thus resulting in a poor energy efficiency.

It is also known to heat the mould by magnetic induction. Here, because the heat is produced directly in the mould, the energy efficiency is improved. The heat can be provided to the mould by inductors, of which the feet rest against the circumferential lateral face of the mould.

In addition, blanks for forming different tire models and of which the moulds therefore have different diameters must be cured within the same production facility. In order to ensure good contact between each inductor and the wall of the mould and to thus achieve good electromagnetic coupling, the moulds having different diameters from one another are heated by respective sets of different inductors.

This is costly however because it requires the provision of numerous sets of inductors. In addition, this very large number of inductors requires a significant volume for the storage thereof and creates work in terms of management and use thereof.

SUMMARY

The object of embodiments of the invention is to reduce the working costs created by the curing of tire blanks by means of induction.

To this end, an embodiment of the invention provides a curing press for a tire blank comprising:
a mould and
inductors capable of heating the press by electromagnetic induction, each inductor comprising a core comprising two feet having respective undersides which are flat and inclined in relation to one another.

This design of the undersides thus makes it possible to use inductors to heat moulds having different diameters. In fact, it enables good contact between the undersides and the wall of the mould and thus good electromagnetic coupling for different diameters of said mould. The same set of inductors can thus be used to heat moulds having different diameters, thus reducing the stock of necessary inductors and facilitating management thereof.

The inductors advantageously form at least one succession in a direction circumferential with respect to an axis of the mould, and the inclination forms an angle $\alpha$, such that $$\alpha = 180° - 180°/N$$

where N denotes the number of inductors in the sequence.

This value makes it possible to make the length of the arc separating the two contact points of each core with the wall equal to the length of the arc separating the two contact points of two successive cores with the wall. An improved homogeneity of the magnetic field in the wall and thus a more homogeneous heating of the mould are thus obtained. Moreover, this property is maintained for a large range of mould diameters. The inductors may form at least one sequence in a direction circumferential with respect to an axis of the mould, and the press may comprise a power circuit supplying current to coils of the inductors in the sequence, such that, at any one given moment, each coil has a north pole which follows a south pole of a coil that precedes immediately in the sequence.

The secondary magnetic fluxes of successive coils thus combine in the press, thus resulting in a homogeneous distribution of the temperature in the mould.

The press according to an embodiment of the invention may also have at least any one of the following features:
the press comprises at least two groups of coils, the coils of one of the groups being arranged above the coils of the other group, the power circuit being such that, at any one given moment, the north poles of the coils of the groups are arranged one above the other;
the press comprises at least two groups of coils, the coils of a first of the groups being arranged above the coils of a second of the groups, the power circuit being such that, at any one given moment, the north poles of the coils of the first group are above the south poles of the coils of the second group; and
the coils in the sequence form two separate sub-groups supplied with current in accordance with a connection in parallel, the coils belonging for example alternately to the first and second sub-groups if the sequence is considered in the circumferential direction.

The press advantageously comprises a hooping ring, which surrounds the sectors, is uninterrupted in the circumferential direction around an axis of the mould, and forms an outer face of the press.

Such a ring ensures particularly good electromagnetic coupling with the inductors due to its continuity. In fact, the flux lines of each inductor can extend all around the axis in the ring. The heating efficiency is thus increased.

In an embodiment the mould is a self-locking mould.

In accordance with an embodiment of the invention an electromagnetic heating inductor which comprises a core comprising two feet having respective undersides which are flat and inclined in relation to one another is also provided.

In accordance with an embodiment of the invention a method for producing a tire in which a tire blank is cured in a press according to the invention is also provided.

The coils are preferably supplied with a current having a frequency between 5 and 200 Hz.

This frequency range makes it possible to penetrate the magnetic flux of the coils deeper into the press.

BRIEF DESCRIPTIONS OF THE DRAWINGS

Further features and advantages of embodiments of the invention will become clearer from the following description of a number of presses and of a number of embodiments, given by way of non-limiting example with reference to the accompanying drawings, in which:

FIGS. 1 and 2 are respectively vertical sectional and perspective views of a press according to the invention;

FIGS. 3 to 6 are vertical sectional and plan views of a press illustrating the principle of the magnetic induction;

FIGS. 10 and 11 are views similar to FIG. 7 showing further embodiments;

FIGS. 12 and 13 are plan views of the core of one of the inductors and of part of the press in an embodiment of the invention;

DETAILED DESCRIPTION OF SPECIFIC EMBODIMENTS

Figure 5:
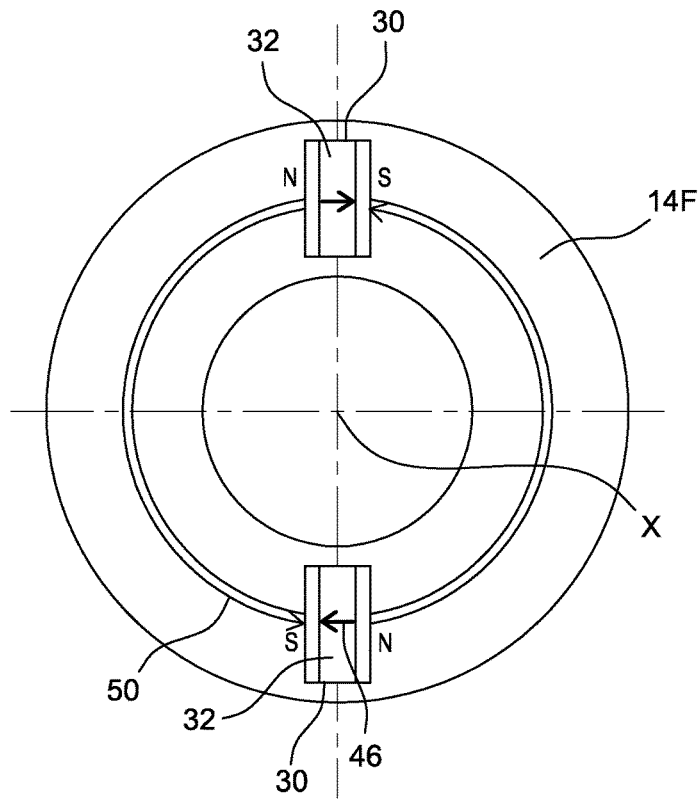

A press 10 forming a curing mould for a tire blank 12 is illustrated in FIGS. 1 and 2. The tire is a vehicle tire. The vehicle, for example, is a passenger vehicle, a utility vehicle or a heavy goods vehicle. The tire may also be a tire for a wheel of a civil engineering vehicle.

The press 10 is generally rotationally symmetrical about a vertical axis X coinciding with the axis of rotation of the tire 12 or of the blank when the tire is arranged in the mould as illustrated in FIG. 1.

The press comprises a mould which comprises first and second axial members 14, that is to say upper and lower axial members respectively, lateral radial segments or sectors 16, and means 18 for connecting each axial member 14 to the radial segments 16. Each axial member 14 is generally disc-shaped and has an inner surface 20 for the moulding of a corresponding plane 22 of the tire. Here, each member 14 comprises a main central part, referred to as a shell, and a part 14M mounted so as to be axially movable with respect to the central part 14F. The radial segments 16 each carry a portion of a surface of annular revolution 24 for the moulding of a tread 26 of the tire.

In the current case, the mould is a self-locking mould, however the invention is not limited to this type of mould. Reference can be made to the application FR-2 908 069 for further details concerning this exemplary embodiment of the mould.

The shells 14F are mounted so as to be slidable in relation to one another and in relation to a stand of the press in the axial direction X. The segments or sectors 16 are mounted so as to be slidable in relation to one another and in relation to the stand in each case along a horizontal direction radial to the axis X. The mounting means ensuring these possibilities for movement are known and are not detailed here.

The press is intended to receive a tire blank formed largely of raw rubber. The blank also comprises reinforcing elements, for example metal elements, textile elements, etc.

In the mould, the blank is cured in order to vulcanize the rubber and at the same time shape the rubber in order to obtain the tire. These procedures are carried out by supplying heat to the mould. This supply is implemented by magnetic induction using means that will be described hereinafter.

These means are supplied with electric current by the power grid, which provides an alternating current of which the voltage is between 400 and 460 volts for example and the frequency is between 50 and 60 hertz, these values not being limiting and being variable depending on the electricity network of a country. Each of the presses which will be described comprises conductors 30 as illustrated in FIGS. 3 and 4. Each inductor 30 comprises a coil 32 supplied with electric current. The coil is formed by a wire conductor of the electric current wound around a rectilinear axis 34 so as to produce the coil of generally cylindrical shape.

Each inductor 30 also comprises a core 36 made of ferromagnetic material comprising a cylindrical central part 38 of axis 34 and having a circular cross section in a plane perpendicular to this axis. The core further comprises two feet 40 arranged so as to give the core, together with the central part 38, a general "U" shape, the two feet 40 being parallel to one another. The core is made of laminated metal sheets so as to limit the appearance of eddy currents therewithin. The form of the core will be described in detail further below.

When current is supplied to the coil 32, said coil generates a magnetic field 42 of closed circuit passing through the core from the end of one of the feet to the end of the other foot and closing up by passing through the part 44 of the mould or of the press intended to be heated and against which the inductor is arranged.

Thus, a main part 46 of the magnetic field passes through the part along the shortest path between the two feet, where it generates eddy currents which thus create a production of heat by the Joule effect. The heat then diffuses by thermal conduction into the part, in particular in the direction indicated by the arrows 48. The law governing magnetic field penetration depends on the electrical and magnetic characteristics of the material of the part 44 and also on the state of saturation. In particular, the penetration of the magnetic field rises if the frequency of the current decreases. In the present case, the current is a low-frequency current.

The magnetic field 42 which closes up in the part 44 does so not only along the short path of the primary field 46. It also comprises a secondary field 50, which for example passes through the periphery of the part in the proximity of the surface thereof. In particular, the field 50 exits from the core via one of the feet, first following the part 44 in the direction opposite the other foot and passing through the part close to the surface thereof along a long path.

In each press, inductors 30 are fixed to the press so as to heat the curing mould. A group of inductors for heating the upper shell 14F, a group of inductors for heating the lower shell 14F, and a further group for heating the sectors 16 may thus be provided. All the parts of the press intended to be heated by induction are made of ferromagnetic material. These parts may be parts of the mould itself or elements of the press in contact with said parts of the mould.

As will be seen, it is possible to arrange the inductors differently in order to utilize the flux thereof and in particular the secondary fluxes between the inductors to the greatest possible extent.

The heating of the upper shell 14F will be described first. Of course, similar arrangements can be applied for the heating of the lower shell.

In FIG. 4 the inductor 30 is arranged above the shell 14F and in contact with the upper annular horizontal face thereof via the undersides of the feet 40. The axis 34 is in a direction orthogonal to the axis X, this direction being tangent to the direction 45 circumferential with respect to the axis X. Since alternating current is supplied constantly to the inductor, said inductor has north and south poles aligned with one another over the axis 34, the magnetic field extending from one to the other. In the shell 14F, the primary field 46 thus extends along the inductor 30, in the circumferential direction, that is to say from left to right in FIG. 4 as considered currently. It should be noted in fact that, since the current is an alternating current, the magnetic field changes polarity numerous times per second. The secondary field 50 also extends from north to south, but passes through the shell 14F in the circumferential direction by passing around the axis X in the direction opposite to that of the primary field 46. In fact, the secondary field can be established freely in the zone of the part distanced furthest from the poles of the inductor since the ring 14F has an annular shape and is solid and integral without an interfering air-gap.

A similar situation is illustrated in FIG. 5, in which an inductor 30 is added, which is connected in series with the first conductor in order to be supplied with electric current and occupies on the ring a position that is symmetrical to that of the first inductor with respect to the axis X. The two inductors are connected such that their north and south poles, at any given moment, are also symmetrical with respect to the axis X. This inductor also generates a primary field 46 and a secondary field 50. Within the shell, in the larger zone not arranged along the inductors, the two secondary fields 50 are oriented at a given moment in the same direction and are added together. At the same moment, the secondary field 50 generated by each inductor slightly decreases the primary field 46 generated by the other, these two fields having opposite directions.

Figure 6:
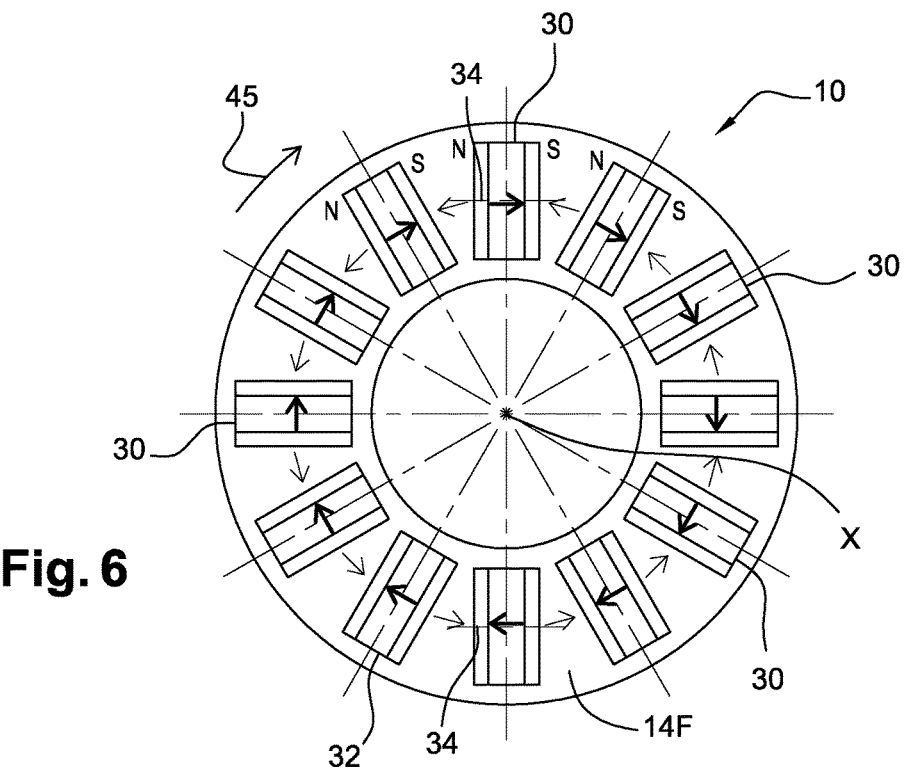

With reference to FIG. 6, in accordance with this principle, the shell in this press 10 is equipped with a number of pairs of inductors, for example fourteen identical inductors 30 divided into seven pairs of two inductors, the inductors of each pair being diametrically opposed in relation to one another with respect to the axis X, as in FIG. 5. The inductors are arranged all around the axis X, distributed uniformly and all extending at the same distance from the axis X. Each inductor is thus the reflection of the preceding inductor in the sequence by an axis of rotation X. The inductors are arranged in succession along the direction 45 circumferential with respect to the axis X. The axis X of each coil is tangent to the circumferential direction and is not directed towards the mould. The inductors are connected in such a way that, at any one given moment, the north pole of each coil succeeds the south pole of the coil following immediately in the sequence. The poles are thus arranged in a sequence of the NSNS type.

In the shell, the secondary fluxes 50 of all the inductors are added together since they are all oriented in the same direction at the same moment. The primary flux of each inductor is by contrast decreased by the secondary fluxes generated by all the other inductors. This arrangement of inductors makes it possible to distribute the magnetic fluxes in the shell so as to heat the portions of said shell arranged along the inductors, but also the portions of said shell arranged along the spaces between said inductors. A continuous and homogeneous heating zone is obtained in the shell all around the axis.

In the present case, the dimension of the air-gap of each inductor, that is to say the distance separating the north and south poles thereof, is selected such that it is equal to the distance separating the inductors from one another in the sequence. These distances are measured at the axis 34 of the inductors. The magnetic fluxes generated in the shell are thus balanced and the heating of said shell is continuous and particularly homogeneous.

First Embodiment

An embodiment of the press 110 according to the invention is illustrated with reference to FIGS. 7 to 9. The inductors 30 have a form similar to that presented above with reference to FIG. 3. However, they are arranged this time around the module at the periphery thereof so as to produce the heat in the sectors 16 or in a part in contact with said sectors. Each inductor 30 is arranged such that the undersides of the feet 40 are in contact with the outer peripheral cylindrical face defined by the sectors 16. This face will be described further below in detail. Moreover, the inductors are oriented such that the axis 34 is horizontal and tangent to the direction 45 circumferential with respect to the axis X. The inductors are identical to one another and all extend at the same height by being distributed uniformly about the axis X. Each inductor is therefore the reflection of the preceding conductor in the sequence by a rotation about the axis X. The orientation of the poles of the inductors is similar to that presented with reference to FIG. 6. The power circuit is thus arranged such that, at any one given moment, the north pole of each coil succeeds the south pole of the coil following immediately in the sequence. A sequence of poles of the NSNS type is thus again produced.

Figure 7:
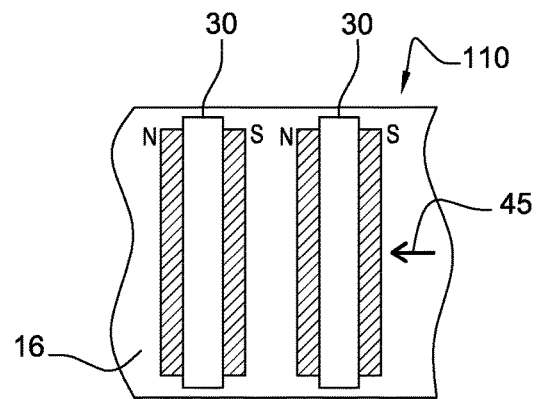
FIGS. 7 and 8 are side and plan views of a press according to an embodiment of the invention, FIG. 9 showing the circuit diagram of the coils.

The inductors are arranged in a single row, that is to say at a single level, as illustrated in FIG. 7. Taking into account the orientation of the polarities, the secondary fields are added together in the portions of the sectors 16 arranged along the spaces between the inductors. In the portions of the sectors arranged along the inductors, the primary field is decreased by the secondary fields generated by all the other inductors. The fluxes in the sectors are thus balanced, and a continuous and relatively homogeneous heating of the periphery of the mould is achieved. As before, the dimension of the air-gap of each inductor is equal to the dimension between the immediately successive inductors in order to improve this homogeneity.

The embodiments of the invention can be applied whether the sectors 16 are separated and independent of one another or are fixed rigidly to one another at least in part.

Figure 9:
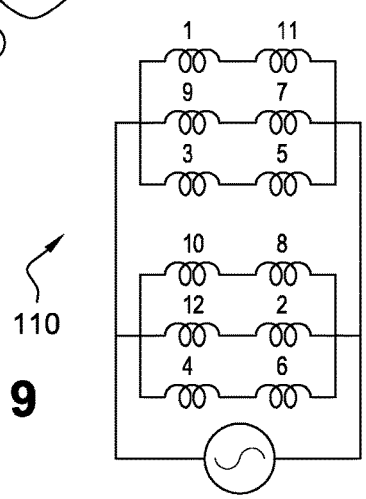

The circuit diagram of the inductors, which have been numbered from 1 to 12 in succession along the circumference, has been illustrated in FIG. 9. The inductors are divided into two separate sub-groups each having six inductors and comprising the even- and odd-numbered inductors respectively. In each sub-group, the six inductors are divided into three separate pairs. The inductors of each pair are not adjacent in this sequence. The pairs are thus formed by the inductors 1 and 11, 9 and 7, and 3 and 5 in the first sub-group, whereas the pairs in the second sub-group are 10 and 8, 12 and 2, and 4 and 6. The inductors of each pair are connected in series so as to form a branch, the three branches being connected in parallel with one another.

Second Embodiment

A further embodiment is illustrated in FIG. 10. The press 210 differs from the preceding press merely by the fact that the inductors 30 for generating the heat in the sectors 16 are provided not at one level but at two levels. This time, two groups of twelve inductors 30 are thus counted, each forming two respective sequences. In each group, the inductors are arranged similarly to FIG. 8. The inductors of the two groups coincide in twos by being arranged one above the other. The inductors are identical in the two groups. Two sequences of poles of the NSNS type are produced.

The coils of the upper group are respectively located above the coils of the lower group, that is to say therealong or in line therewith. The power circuit is such that, at any one given moment, the north pole of each coil in each sequence follows a south pole of a coil immediately before in the sequence, and the north poles of the coils of the upper group are above the north poles of the coils of the lower group. The poles of the upper group thus follow one another in the same direction as those of the lower group around the circumference.

Third Embodiment

In this embodiment, illustrated in FIG. 11, the press 310 is identical to the preceding press except that the power circuit is such that, at any one given moment, the north poles of the coils of the upper group are above the south poles of the coils of the lower group. The poles of the upper group and those of the lower group therefore this time follow one another in opposite directions around the circumference.

Embodiment of the Inductors

An embodiment of the inductors of the presses presented with reference to FIGS. 7 to 11 will now be presented with reference to FIGS. 12 and 13.

Figure 8:
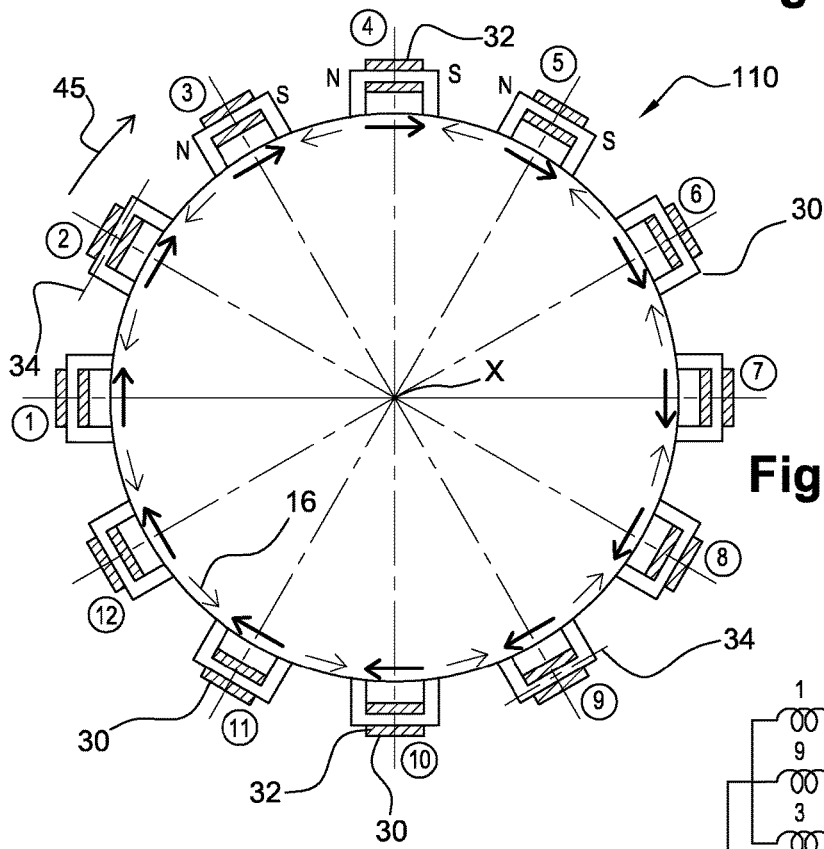

It can be seen that, with reference to FIG. 8, the equality between the dimension of the air-gap of each inductor and the distance separating two successive conductors makes it possible to obtain a good homogeneity in the distribution of the magnetic fluxes. It is conventional to use, in the same press, moulds having different dimensions and in particular different diameters from one another in accordance with the tire model to be produced. The present embodiment makes it possible to use the same inductors in the same general configuration whilst observing this equality so as to adapt the press to moulds having different outer diameters.

The feet 40 of the core 36 have undersides 60 which are flat and inclined in relation to one another so as to form an angle α. Each underside 60 remains parallel to the axis X. N denotes the number (pair) of inductors of the group arranged in succession along the circumference. The angle α is selected such that:

α=180°−180°/N.

FIG. 13 illustrates, in dashed lines, the contact between the upper inductor 30 and the outer face of the mould in mould configurations of minimum diameter and maximum diameter respectively. The contact between the core and a mould of intermediate diameter is also illustrated in solid lines.

B and C denote the points of contact of the respective undersides 60 of the core arranged at the top in FIG. 13 with the periphery of the mould. Since the periphery is cylindrical with circular cross section and the undersides are flat, this contact occurs at each underside along a vertical line corresponding to a point in the plane of horizontal section of FIG. 13. Equally, A denotes the point of contact of the closest underside of the preceding inductor in the sequence, and D denotes the point of contact of the closest underside of the inductor following in the sequence. In order to simplify the illustration, the number of inductors in FIG. 13 has been limited to four, however the concept remains valid whatever the number (pair) N of inductors. An angle β having its apex on the axis X is formed by the points of contact B and C, and an angle γ having its apex at the axis X and passing via points A and B are defined.

The aforementioned angle α makes it possible to ensure that the angle β remains unchanged whatever the diameter of the mould. In other words, the point B is displaced on a straight line passing via the axis X when the diameter varies. This is also true for the point C. It is then sufficient to select, in accordance with the minimum diameter of the mould, the dimension a, which denotes the shortest distance between the two undersides 60, and to select, in accordance with the maximum diameter of the mould, the dimension b, which denotes the greatest distance between the two undersides. It is therefore possible to select the dimensions a and b such that the angle γ separating the points of contact of the successive inductors is equal to the angle β separating the points of contact of the same inductor. Consequently, by denoting with AB and BC respectively the distance between the successive inductors and the air-gap of each inductor, the property of equality between these values is obtained, moreover whatever the selected diameter for the mould and with use of the same inductors.

The slight difference between each primary flux and the sum of the secondary fluxes in the spaces between the inductors is compensated for by the diffusivity of the material forming the periphery of the mould and the mass thereof.

Fourth Embodiment

Figure 14:
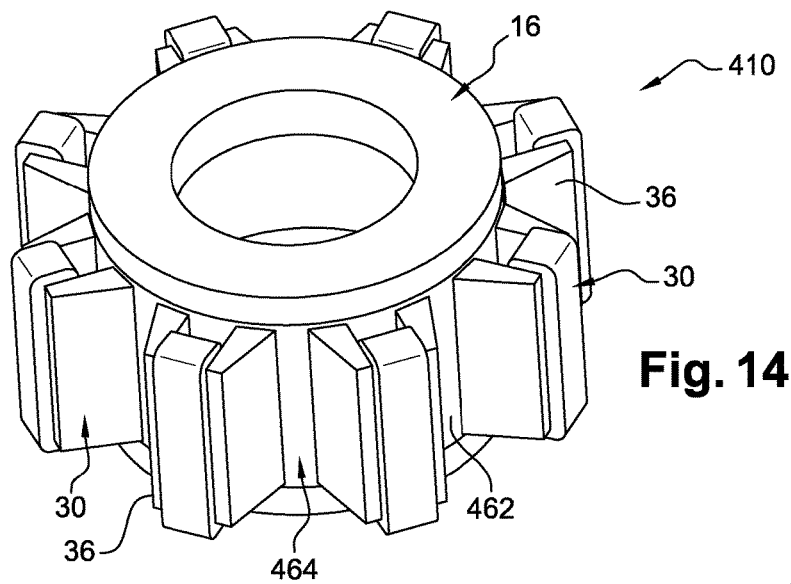
FIGS. 14 and 15 are perspective and plan views of a press according to an embodiment of the invention.
Figure 15:
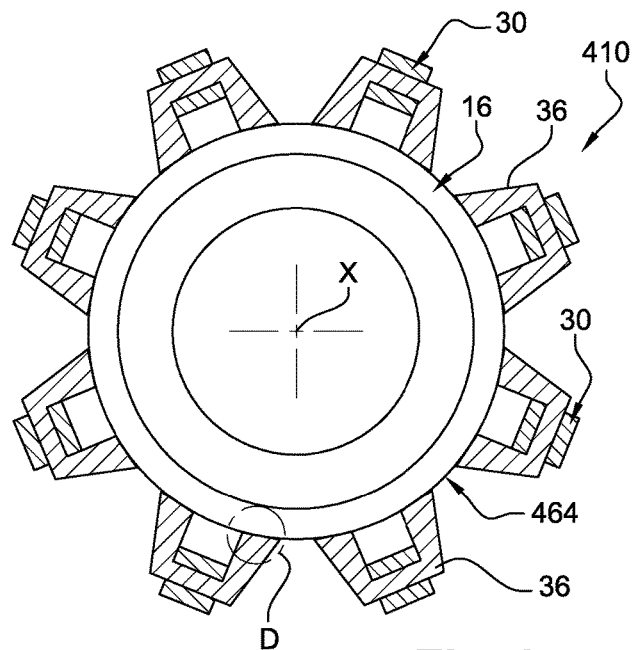
Figure 16:
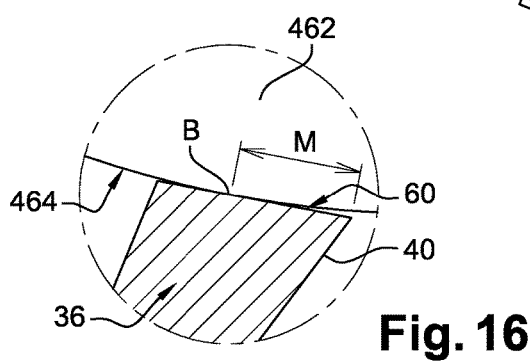
FIG. 16 is a view on a larger scale of a detail D of the press in FIG. 15.

A further embodiment of the press according to the invention has been illustrated in FIGS. 14 to 16. The press 410 is largely identical to the press described above with reference to FIGS. 7 and 8 and thus also comprises inductors of the type as described with reference to FIGS. 12 and 13. There are eight of these inductors in the present case. The press differs from that in FIGS. 7 and 8 in that it comprises a hooping ring surrounding the sectors or a hooping sleeve 462 forming part of the lateral wall of the mould and part of the outer circumferential lateral face thereof. The hooping ring has an outer cylindrical face of circular cross section in a horizontal plane perpendicular to the axis of the mould. It also has an inner face of truncated shape. These two faces are coaxial with the axis X. The ring thus has an annular general form. The hooping ring is continuous and uninterrupted in the circumferential direction about the axis X. It thus offers a form that is particularly conducive to the closing of the secondary magnetic field of each coil and thus improves the electromagnetic coupling.

The inner truncated face of the hooping ring is designed so as to cooperate by the corner effect with an outer face, which is also truncated, of the lateral sectors of the mould so that the sliding of the ring relative to these sectors in the direction of the axis X causes each of said sectors to slide in the radial direction in order to close the mould. This is thus a technique alternative to that of the self-locking mould presented above.

The undersides of the inductors are formed in accordance with that described with reference to FIGS. 12 and 13. In the plane of section of FIG. 16, the point of contact B between the underside and the face 464 has been illustrated in particular.

Figure 17:
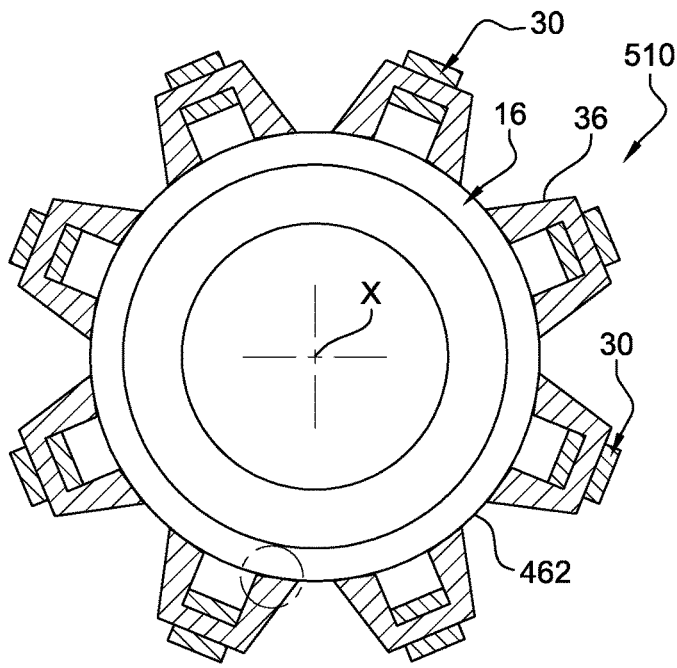
FIGS. 17 and 18 are views similar to FIGS. 15 and 16 showing a variant of the press in FIG. 14.
Figure 18:
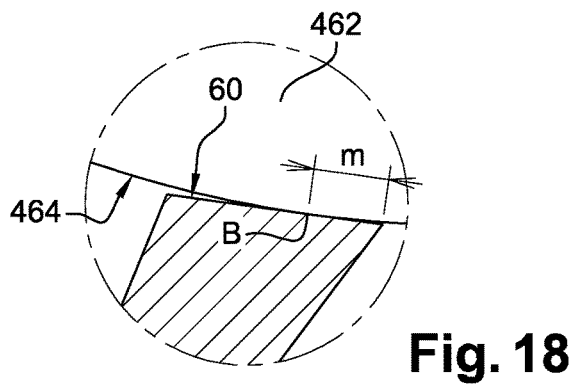

A press 510 comprising a similar mould which differs from the previous mould merely because it has a larger diameter has been illustrated in FIGS. 17 and 18. By contrast, this press comprises the same inductors 30 as the previous press.

Figure 19:
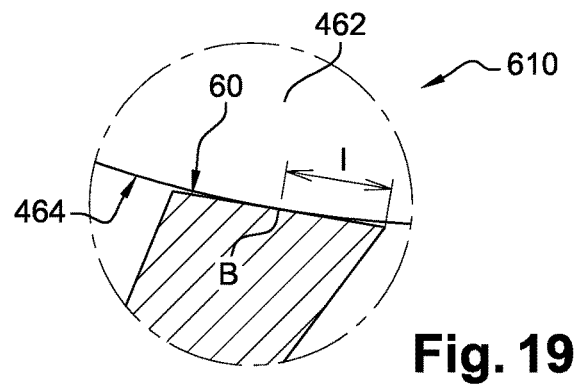
FIG. 19 is a view similar to FIG. 16 showing a further variant.

Likewise, a view of a press 610 similar to FIGS. 16 and 18 has been illustrated in FIG. 19, in which the diameter of the hooping ring is between those of the presses 410 and 510, the inductor 30 once again remaining unchanged.

The same inductors are therefore used in these three presses, thus illustrating the fact that the same inductors can be used to heat moulds having different diameters.

In the three FIGS. 16, 18 and 19, M, m and l denote respectively the distance from the point B to the outer edge of the underside. It can thus be seen that this distance decreases as the diameter of the mould and of the press, that is to say of the ring 464, increases.

It should be noted here that the inductors that have been presented do not serve generally to heat the mould during the entire duration of vulcanization of the rubber of the tire. In fact, it is preferable to use said inductors to provide an initial quantity of heat, then to stop the operation of the inductors, the heat thus produced then being diffused and being utilized by inertia for the entire vulcanization phase.

The invention can be applied at current frequencies between 5 and 200 hertz. It can be applied in particular for high-frequency induction.

Of course, the invention could be modified in numerous ways without departing from the scope thereof.

The invention claimed is:

1. A curing press for a tire blank, comprising:
    a mold,
    inductors distinct from the mold and capable of heating the press by electromagnetic induction, each inductor comprising a core comprising only two feet total, each of these two feet having a respective underside that is flat and inclined in a direction towards the underside of the other foot and wherein the undersides of the two feet are in contact with the mold, and wherein the two feet are poles of the inductor core,
    wherein the inductors form a sequence in a circumferential direction with respect to an axis (X) of the mold and an inclination between the two feet of each inductor forms an angle $\alpha$ such that $\alpha = 180° - 180°/N$ wherein N denotes the number of inductors in the sequence, wherein the press comprises a power circuit for supplying current to a respective coil of each of the inductors in the sequence, such that, at any one given moment, the north pole of each coil follows a south pole of a coil that precedes immediately in the sequence, and
    wherein the coils in the sequence form two separate sub-groups supplied with current in accordance with a connection in parallel, the coils belonging alternately to the first and second sub-groups if the sequence is considered in the circumferential direction.

2. The press according to claim 1, comprising at least two groups of coils, the coils of one of the groups being respectively arranged above the coils of the other group, the power circuit being such that, at any given moment, a respective north pole of each coil of one of the groups is aligned along a vertical direction with a respective north pole of a respective one of the coils of the other group.

3. The press according to claim 1, comprising at least two groups of coils, the coils of a first of the groups being respectively arranged above the coils of a second of the groups, the power circuit being such that, at any one given moment, a respective north pole of each coil of the first group being aligned along a vertical direction with a respective south pole of a respective one of the coils of the second group.

4. The press according to claim 1, further comprising a hooping ring which is uninterrupted in a circumferential direction around an axis (X) of the mold and forms an outer face of the press.

5. The press according to claim 1, wherein the mold is a self-locking mold.

6. A method for producing a tire, comprising curing a tire blank in the press according to claim 1.

7. A method according to claim 6, wherein the coils of the inductors are supplied a current having a frequency between 5 and 200 Hz.

* * * * *